No. 850,307. PATENTED APR. 16, 1907.
E. W. LLOYD & W. H. SODEAU.
MEANS FOR HEATING COMPRESSED AIR OR OTHER GASES.
APPLICATION FILED JUNE 22, 1906.
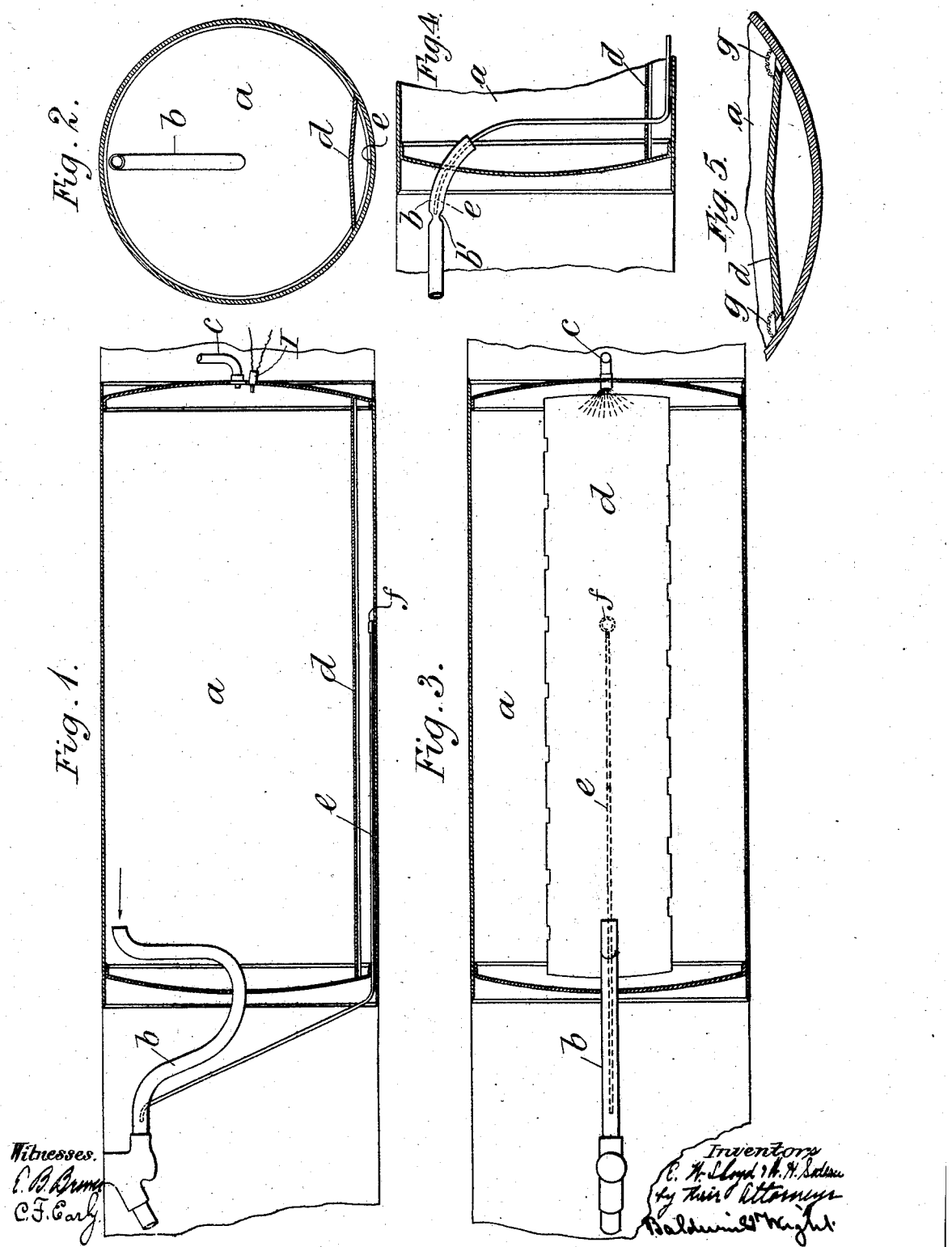

UNITED STATES PATENT OFFICE.

EDWARD W. LLOYD AND WILLIAM H. SODEAU, OF NEWCASTLE-UPON-TYNE, ENGLAND, ASSIGNORS TO W. G. ARMSTRONG, WHITWORTH & COMPANY, LIMITED, OF NEWCASTLE-UPON-TYNE, ENGLAND.

MEANS FOR HEATING COMPRESSED AIR OR OTHER GASES.

No. 850,307.  Specification of Letters Patent.  Patented April 16, 1907.

Application filed June 22, 1906. Serial No. 322,935.

*To all whom it may concern:*

Be it known that we, EDWARD WILLIAM LLOYD, a commander in the Royal Navy, and WILLIAM HORACE SODEAU, doctor of science, subjects of the King of Great Britain, both residing at Elswick Works, Newcastle-upon-Tyne, England, have invented certain new and useful Improvements in Means for Heating Compressed Air or other Gases, of which the following is a specification.

The object of this invention is to remedy certain possible sources of danger existing in devices in which fuel is burnt in a chamber containing compressed air, (or other gas capable of supporting combustion,) and is especially applicable to the arrangements described in the following United States patents of Wm. H. Sodeau—viz., 827,891, of August 7, 1906; No. 828,432 of August 14, 1906, and No. 835,262 of November 6, 1906. If from any cause the fuel supplied in such arrangements should fail to ignite or become prematurely extinguished, the said fuel may accumulate in the air reservoir or chamber in which combustion is intended to take place and which will be hereinafter referred to as the "combustion-chamber." Should compressed air be then readmitted to the combustion-chamber without the removal of the accumulated fuel and the igniting device be subsequently brought into operation, the combustion of the accumulated fuel may cause an objectionable increase of pressure in the combustion-chamber. In order to prevent this, we provide automatic means for preventing the accumulation of fuel in the combustion-chamber, and as an additional precaution (to guard against any possible failure or incomplete action of the first safeguard) we sometimes arrange a screen, hindering the combustion of any such accumulated fuel.

The removal of the fuel is effected by means of a draining-tube, one end of which is connected to the pipe conveying air from the combustion-chamber, while the other terminates near the bottom of the said chamber and is preferably provided with an appropriate strainer in order that the tube may not become choked by foreign substances. The aspirating effect of the stream of air passing through the air-pipe while work is being done, coupled with the loss of pressure due to friction in the said air-pipe, causes any unburnt fuel to be drawn up the draining-tube and discharged with the issuing air. In order that the aspirating effect may be fully utilized, the draining-tube is preferably connected to the air-pipe in a direction making an acute angle with that of the air traveling toward the end of the draining-tube, or the draining-tube may lie within the air-pipe. If desired, the air-pipe may be constricted in the neighborhood of the junction in accordance with the well-known principles employed in the construction of steam-blowers and aspirating devices. We also sometimes arrange within the combustion-chamber an appropriately-formed screen or false bottom, not completely cutting off the main air-space from the lower space, but provided with appropriate holes or gaps through which any unburnt fuel can drain down, and so be protected from the flash of the primer or other device employed for normal ignition. The holes or gaps in the screen or false bottom may be covered with wire-gauze, if desired, in order to further guard against the ignition of any unburnt fuel.

Figures 1, 2, and 3 are respectively a vertical longitudinal section, a vertical transverse section, and a horizontal longitudinal section of an air-reservoir fitted according to this invention. Figs. 4 and 5 show modifications.

*a* is the reservoir for compressed air. *b* is the pipe leading air from it to the engine, and *c* is the pipe supplying fuel to it. Although the pipe *c* is shown as supplying the fuel in the form of a spray, it will be understood that the fuel may be burnt in any other way. For example, it may be delivered into and be burnt in an open dish. The air-reservoir *a* is also provided with any suitable means (such as an igniter I) for igniting the fuel.

*d* is a false bottom inside the reservoir *a* and provided with notched edges, as shown, to allow the unburnt fuel to run down under it.

*e* is a pipe having a strainer *f* at one end, while its other end is led into the pipe *b* and points in the same direction as the flow of air in it.

Fig. 4 shows a modification in which the draining-tube *e* is led up inside the pipe *b*, and the latter is constricted at *b'* near the end of the pipe e. Fig. 5 shows the notched edges of the false bottom d covered with wire-gauze g.

What we claim is—

1. The combination of a reservoir suitable for containing compressed air, means for supplying fuel to the reservoir at a point above its bottom, means for igniting the charge in the reservoir, a pipe suitable for conducting compressed air and the products of combustion from the reservoir, and a second pipe having one end near the bottom of the reservoir and its other end connected to the first pipe.

2. The combination of a reservoir suitable for containing compressed air, means for supplying fuel to the reservoir at a point above its bottom, means for igniting the charge in the reservoir, a pipe suitable for conducting compressed air and the products of combustion from the reservoir, and means whereby the flow of air and combustion products in the pipe withdraws unburnt fuel from the reservoir.

3. The combination of a reservoir suitable for containing compressed air, means for supplying fuel to the reservoir, a pipe suitable for conducting compressed air and the products of combustion from the reservoir, a false bottom to the reservoir and a second pipe below the false bottom and having one end near the bottom of the reservoir and its other end connected to the first pipe.

4. The combination of a reservoir suitable for containing compressed air, means for supplying fuel to the reservoir, a pipe suitable for conducting compressed air and the products of combustion from the reservoir, a second pipe having one end near the bottom of the reservoir and its other end connected to the first pipe and a strainer on the lower end of the second pipe.

5. The combination of a reservoir suitable for containing compressed air, means for supplying fuel to the reservoir, a pipe suitable for conducting compressed air and the products of combustion from the reservoir, a false bottom to the reservoir, a second pipe below the false bottom and having one end near the bottom of the reservoir and its other end connected to the first pipe, and a strainer on the lower end of the second pipe.

6. The combination of a reservoir suitable for containing compressed air, means for supplying fuel to the reservoir at a point above its bottom, a pipe suitable for conducting compressed air and the products of combustion from the reservoir and a false bottom to the reservoir.

EDWARD W. LLOYD.
WILLIAM H. SODEAU.

Witnesses:
J. HONNER,
GEO. GAMBLE.